United States Patent
Chang

(10) Patent No.: US 8,491,066 B2
(45) Date of Patent: Jul. 23, 2013

(54) COMPUTER CASE

(75) Inventor: Chin-Ming Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 348 days.

(21) Appl. No.: 12/884,465

(22) Filed: Sep. 17, 2010

(65) Prior Publication Data

US 2011/0234065 A1  Sep. 29, 2011

(30) Foreign Application Priority Data

Mar. 29, 2010  (TW) ................................. 99109289 A

(51) Int. Cl.
    *A47B 97/00*  (2006.01)
(52) U.S. Cl.
    USPC .................. 312/223.2; 55/385.6; 361/679.49
(58) Field of Classification Search
    USPC ............. 312/223.2, 257.1, 265.5, 265.6, 236, 312/210, 213, 7.2, 293.3; 361/679.48, 679.49, 361/695, 724; 454/184; 55/385.1, 385.4, 55/385.6, DIG. 31
    See application file for complete search history.

(56) References Cited

U.S. PATENT DOCUMENTS

| | | | | |
|---|---|---|---|---|
| 4,600,420 A | * | 7/1986 | Wydeven et al. | 55/501 |
| 4,889,542 A | * | 12/1989 | Hayes | 95/285 |
| 5,514,036 A | * | 5/1996 | Lin | 454/184 |
| 5,673,029 A | * | 9/1997 | Behl et al. | 340/635 |
| 5,766,285 A | * | 6/1998 | Killman | 55/385.6 |
| 5,912,369 A | * | 6/1999 | Reeves | 55/385.1 |
| 5,935,282 A | * | 8/1999 | Lin | 55/385.6 |
| 6,007,169 A | * | 12/1999 | Li et al. | 312/223.2 |
| 6,296,333 B1 | * | 10/2001 | Lee et al. | 312/223.2 |
| 6,297,950 B1 | * | 10/2001 | Erwin | 361/679.49 |
| 6,421,238 B1 | * | 7/2002 | Negishi | 361/695 |
| 6,793,715 B1 | * | 9/2004 | Sandberg | 95/273 |
| 6,873,523 B2 | * | 3/2005 | Shyr | 361/679.02 |
| 7,323,027 B1 | * | 1/2008 | Fu et al. | 55/385.6 |
| 7,436,665 B2 | * | 10/2008 | Chen et al. | 361/695 |
| 7,466,545 B2 | * | 12/2008 | Hung | 361/679.48 |
| 7,848,100 B2 | * | 12/2010 | Wayman et al. | 361/679.5 |
| 2006/0265721 A1 | * | 11/2006 | Shizuya et al. | 720/600 |

* cited by examiner

*Primary Examiner* — James O Hansen
(74) *Attorney, Agent, or Firm* — Altis Law Group, Inc.

(57) ABSTRACT

A computer case includes a housing, a first dust screen and a second dust screen. The housing defines two openings at opposite ends of the housing. The first dust screen and the second dust screen each include a piece of nonwoven fabric and a bracket, and are respectively covered on the two openings. The nonwoven fabric is covered on the bracket. The bracket includes a rim and a plurality of reinforcement ribs connected to an inner side surface of the rim.

4 Claims, 4 Drawing Sheets

COMPUTER CASE

BACKGROUND

1. Technical Field

The present disclosure relates to cases, and particularly, to a computer case.

2. Description of the Related Art

A desktop computer usually includes a main body, a display, and various peripheral devices. The main body further includes a computer case, and various electronic components, such as a motherboard, a central processing unit (CPU), an interface card, and a memory, disposed inside the computer case. These electronic devices generate significant amount of heat, thus the computer case usually includes a fan located on a vent to dissipate heat. However, when the fan blows cooler air in through the vent, dust contained in the air also flows into the vent with the air, thereby polluting the electronic devices.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
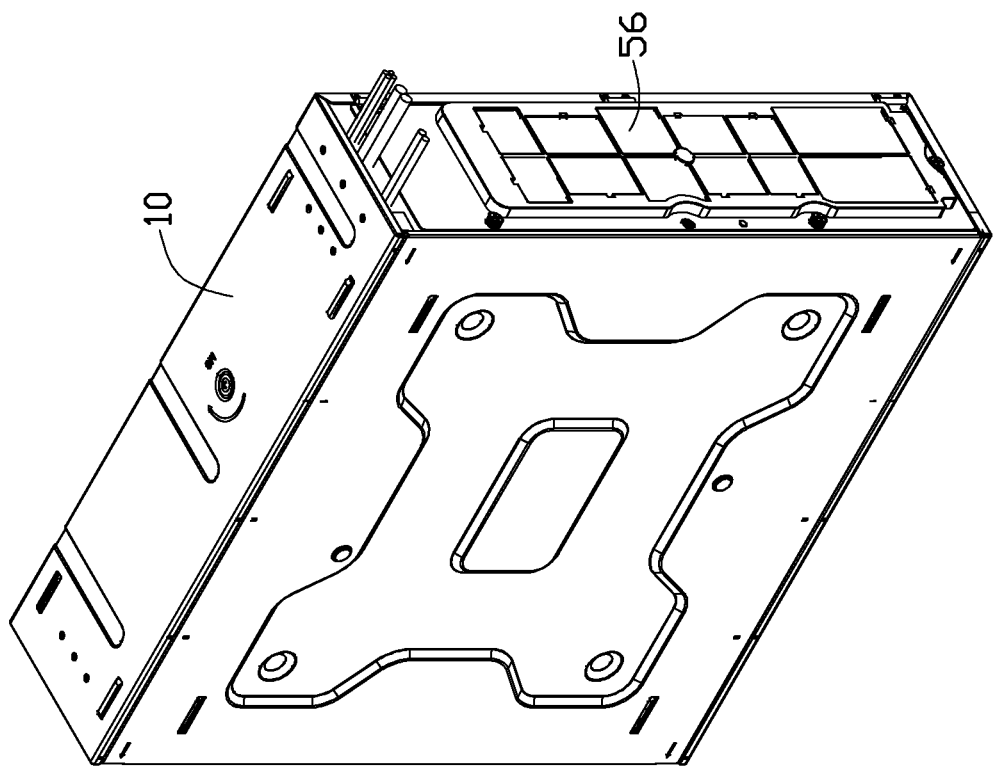
FIG. 1 is an assembled, isometric view of one embodiment of computer case.
Figure 2:
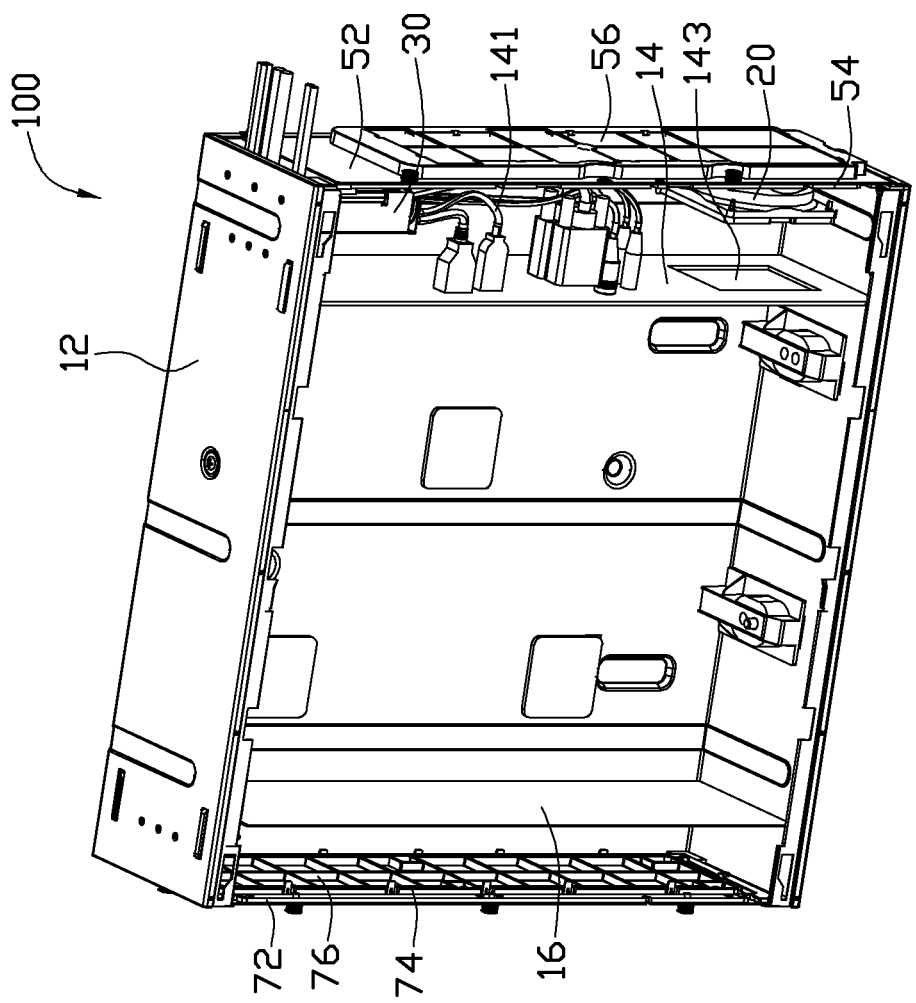
FIG. 2 is a partial, assembled, isometric view of the computer case shown in the FIG. 1.

Referring to FIGS. 1 and 2, one embodiment of a computer case 100 includes a housing 10, a fan 20, a cable box 30, a first reinforcement member 52, a first seal 54, a first dust screen 56, a second reinforcement member 72, a second seal 74 and a second dust screen 76.

The housing 10 is substantially rectangular, and includes four side plates 12, a rear plate 14 and a front plate 16. The four side plates 12 are connected to adjacent side plates 12, and cooperatively define a chamber having two openings (not labeled). The rear plate 14 and the front plate 16 are both substantially rectangular, and are fixed respectively in the chamber adjacent to the two openings. The rear plate 14 includes a number of connection ports (not labeled) and a number of wires 141 connecting with the connection ports. The rear plate 14 further defines a vent 143 at the end of the rear plate 14. The fan 20 is fixed on one of the side plates 12 corresponding to the vent 143.

Figure 3:
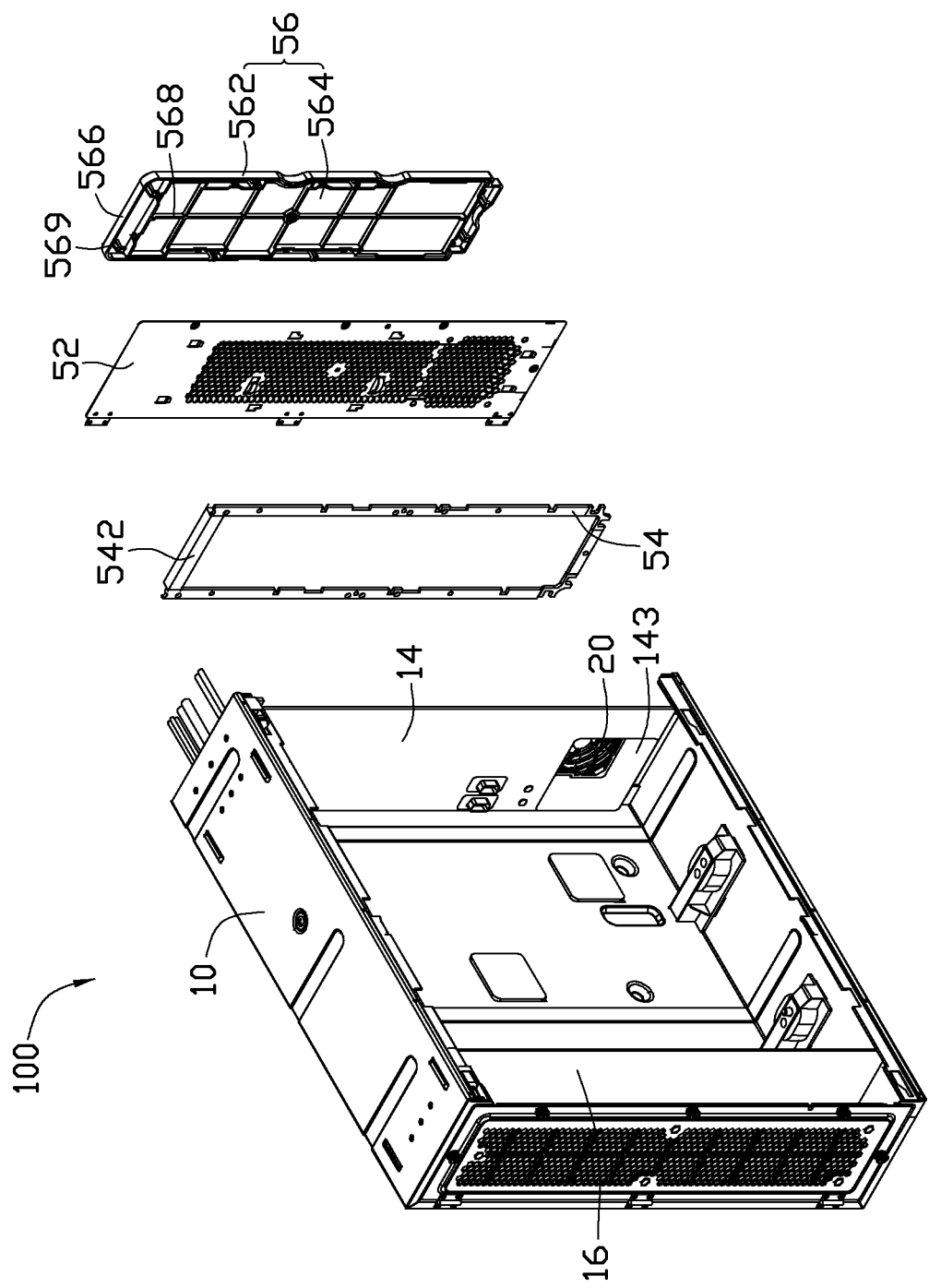
FIG. 3 is a partial, exploded, isometric view of the computer case shown in FIG. 1.
Figure 4:
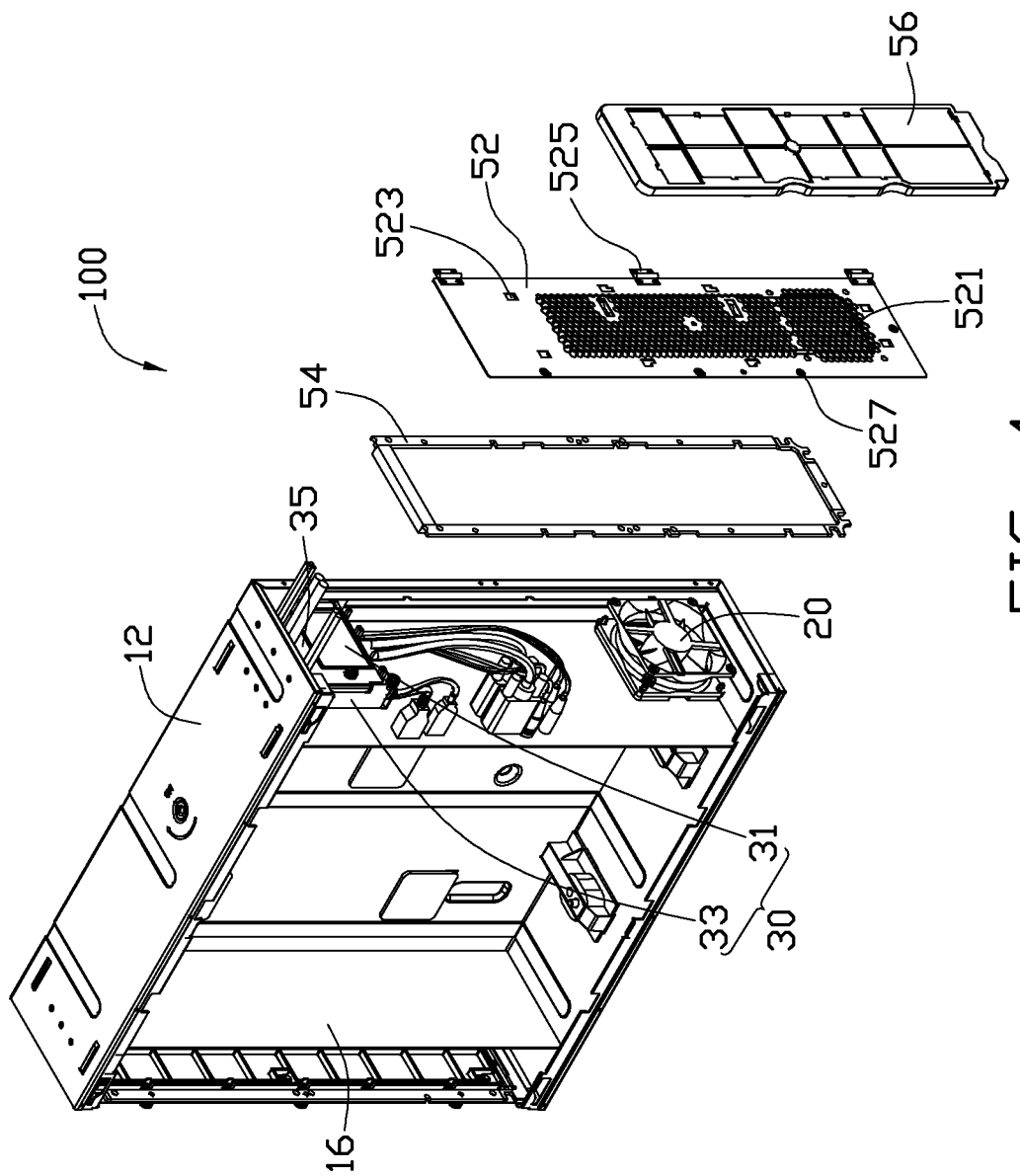
FIG. 4 is similar to FIG. 3, but viewed from another aspect.

Referring to FIGS. 3 and 4, the cable box 30 includes a main body 31 and two connection portions 33. The main body 31 is a substantially rectangular plate. The two connection portions 33 respectively extend from opposite ends of the main body 31. Each connecting portion 33 is fixed on an end of the rear plate 14 away from the vent 143, such that the cable box 30 and the rear plate 14 cooperatively define two openings 35 which are opposite to one another. One of the two openings 35 is defined opposite to one side plate 12, and is fixed on the end of the rear plate 14 away from the vent 143.

The first reinforcement member 52 is a substantially rectangular plate, and includes a dissipating portion 521. The dissipating portion 521 is located on a middle portion of the first reinforcement member 52. The dissipating portion 521 defines a number of through holes (not labeled) arranged in a matrix. The first reinforcement member 52 defines a number of latching holes 523 on the periphery of the first reinforcement member 52 and a number of threaded holes 527 along an end of the first reinforcement member 52. The first reinforcement member 52 further includes three hinges 525 located on an end of the first reinforcement member 52 away from the threaded holes 527.

The first seal 54 is a substantially rectangular frame, and includes four sealing ribs (not labeled) connected to adjacent sealing ribs. The size of the first seal 54 is same as that of the first reinforcement member 52. The first seal 54 further includes a plug portion 542 arranged at one of the sealing ribs. The first seal 54 is made of soft plastic, rubber or hermetic sponge.

The first dust screen 56 includes a bracket 562 and a piece of nonwoven fabric 564. The bracket 562 includes a rim 566, a number of reinforcement ribs 568 and a number of hooks 569. Opposite ends of each reinforcement rib 568 are connected to an inner side surface of the rim 566. The hooks 569 are fixed on the rims 566. The nonwoven fabric 564 is covered on the bracket 562.

In the illustrated embodiment, the second reinforcement member 72 is the same as the first reinforcement member 52. The second dust screen 76 is the same as the first dust screen 56. The second seal 74 is the same as the first seal 54, except for that the second seal 74 does not form any plug portion 542.

During use of the computer case 100, the wires 14 are orderly passed through the two openings 35 of the cable box 30. The hooks 569 of the first dust screen 56 are received in the latching holes 523 of the first reinforcement member 52, such that the first dust screen 56 is fixed on the first reinforcement member 52. The first seal 54 is fixed on a side surface of the first reinforcement member 52 away from the first dust screen 56. The first reinforcement member 52 is connected to the housing 10 by the hinges 525. The plug portion 542 of the first seal 54 resists between the cable box 30 and the side plate 12, such that the wires 141 are fixed between the plug portion 542 and the side plate 12. A plurality of threaded members (not shown) fix the first reinforcement member 52 to the side plate 12. Finally, the second reinforcement member 72, the second seal 74 and the second dust screen 76 are assembled together in the same manner as the first reinforcement member 52, the first seal 54 and the first dust screen 56.

The nonwoven fabrics 564 has a high permeability, such that the first dust screen 56 and the second dust screen 76 can prevent dust from entering the computer case 100. Thus, the computer case 100 has a better dust-proof function capability. Furthermore, the first seal 54 and the second seal 74 improve the dust-proof function of the computer case 100.

It is to be understood that the first reinforcement member 52, the second reinforcement member 72, the first seal 54 and the second seal 74 can also be correspondingly omitted, and the first dust screen 56 and the second dust screen 76 are fixed on the housing 10. The cable box 30 can also be omitted.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A computer case comprising:
   a plurality of side plates, each side plate is connected to adjacent side plates, and cooperatively defining a housing with a first opening and a second opening at opposite ends of the housing;
   a rear plate received in the housing adjacent to the first opening;
   a front plate received in the housing adjacent to the second opening;
   a first reinforcement member and a second reinforcement member rotatably connected to the housing respectively;
   a first seal and a second seal;
   a first dust screen comprising a piece of nonwoven fabric and a plurality of hooks; and
   a second dust screen comprising a piece of nonwoven fabric, wherein the first dust screen is covering the first opening, the first dust screen is fixed on the first reinforcement member away from the housing, and the first seal is fixed on a side surface of the first reinforcement member away from the first dust screen and located between the first reinforcement member and the rear plate, the second dust screen is covering the second opening, the second dust screen is fixed on the second reinforcement member away from the housing, the second seal is fixed on a side surface of the second reinforcement member away from the second dust screen and located between the second reinforcement member and the front plate, and the first reinforcement member defines a plurality of latching holes on a periphery of the first reinforcement member to receive the hooks.

2. The computer case of claim 1, wherein the first dust screen further comprises a bracket, and the nonwoven fabric is covered on the bracket.

3. The computer case of claim 2, wherein the bracket comprises a rim and a plurality of reinforcement ribs connected to an inner side surface of the rim.

4. The computer case of claim 1, wherein the first reinforcement member comprises a dissipating portion located on a middle portion of the first reinforcement member, and the dissipating portion defines a plurality of through holes.

* * * * *